United States Patent

[11] 3,578,376

| [72] | Inventors | Tatsuo Hasegawa<br>Okazaki-shi;<br>Kohichi Yoshie; Yasuhiro Kamijima,<br>Toyota-shi, Japan |
|---|---|---|
| [21] | Appl. No. | 848,302 |
| [22] | Filed | Aug. 7, 1969 |
| [45] | Patented | May 11, 1971 |
| [73] | Assignee | Toyota Jidosha Kogyo Kabushiki Kaisha<br>Toyota-shi, Japan |
| [32] | Priority | Sept. 20, 1968 |
| [33] | | Japan |
| [31] | | 43/67598 |

[54] SEAT CONSTRUCTION OF A VEHICLE
6 Claims, 31 Drawing Figs.

[52] U.S. Cl. .................................................. 296/65,
297/216
[51] Int. Cl. .................................................. B60r 21/10,
B60n 1/02
[50] Field of Search .......................................... 296/65, 65
(.1); 297/216; 244/122, 141

[56] References Cited
UNITED STATES PATENTS

| 2,682,931 | 7/1954 | Young | 297/216(X) |
| 2,735,476 | 2/1956 | Fieber | 297/216 |
| 2,818,909 | 1/1958 | Burnett | 297/216 |
| 2,823,730 | 2/1958 | Lawrence | 297/216 |

Primary Examiner—Kenneth H. Betts
Assistant Examiner—Leslie J. Paperner
Attorney—George B. Oujevolk ABSTRACT: A seat assembly for a vehicle is composed of a floor, a seat, a movable support member supporting the seat to permit the seat to move relative to the floor, a pin or stationary member fixing the seat on the floor to prevent the seat from moving relative to the floor which includes a weak link or releasable section, and an energy absorbing member disposed between the floor and the seat. When an impact in the forward direction is applied to the seat by a rear-end-collision with a following car, if the impact force exceeds a predetermined permissible value, the stationary member is released to permit the seat to move rearwards relative to the floor by the inertia of the seat and passengers, and, simultaneously the energy absorbing member is deformed so as to reduce the impact imposed on the passengers and prevent them from being injured.

PATENTED MAY 11 1971

INVENTORS
Tatsuo Hasegawa
Kohichi Yoshie
Yasuhiro Kamijima
Georges Onyeroth

BY

ATTORNEY

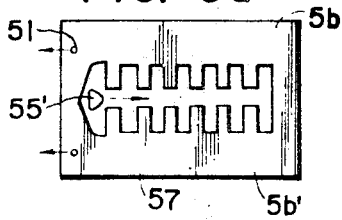
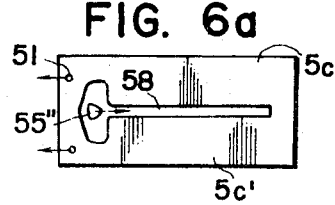
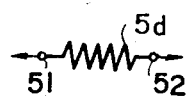
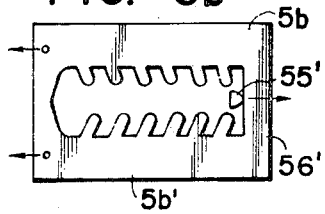
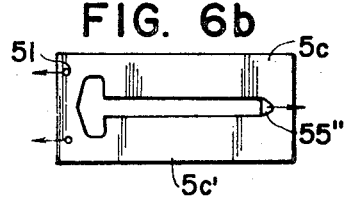
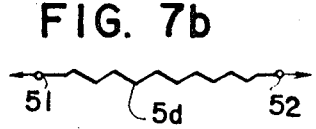
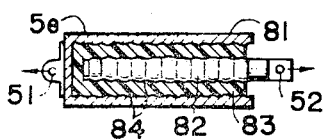
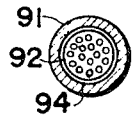
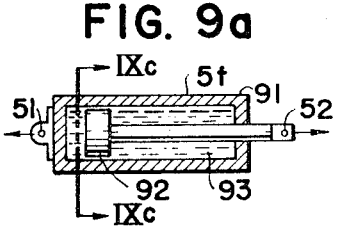
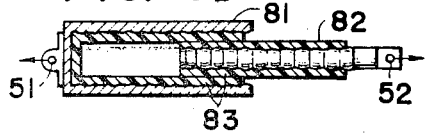
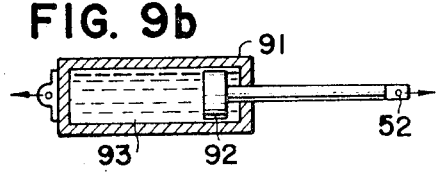
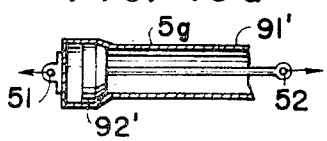
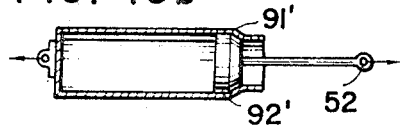

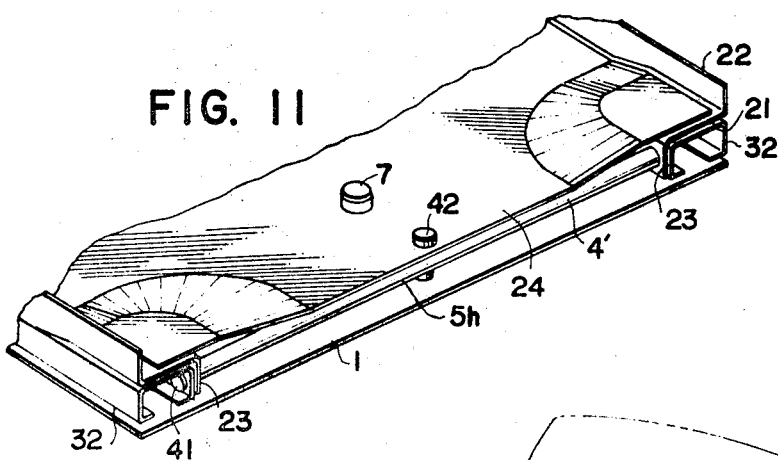
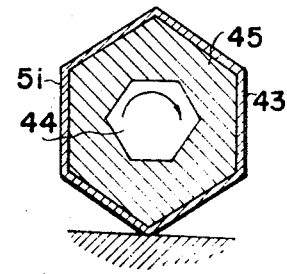
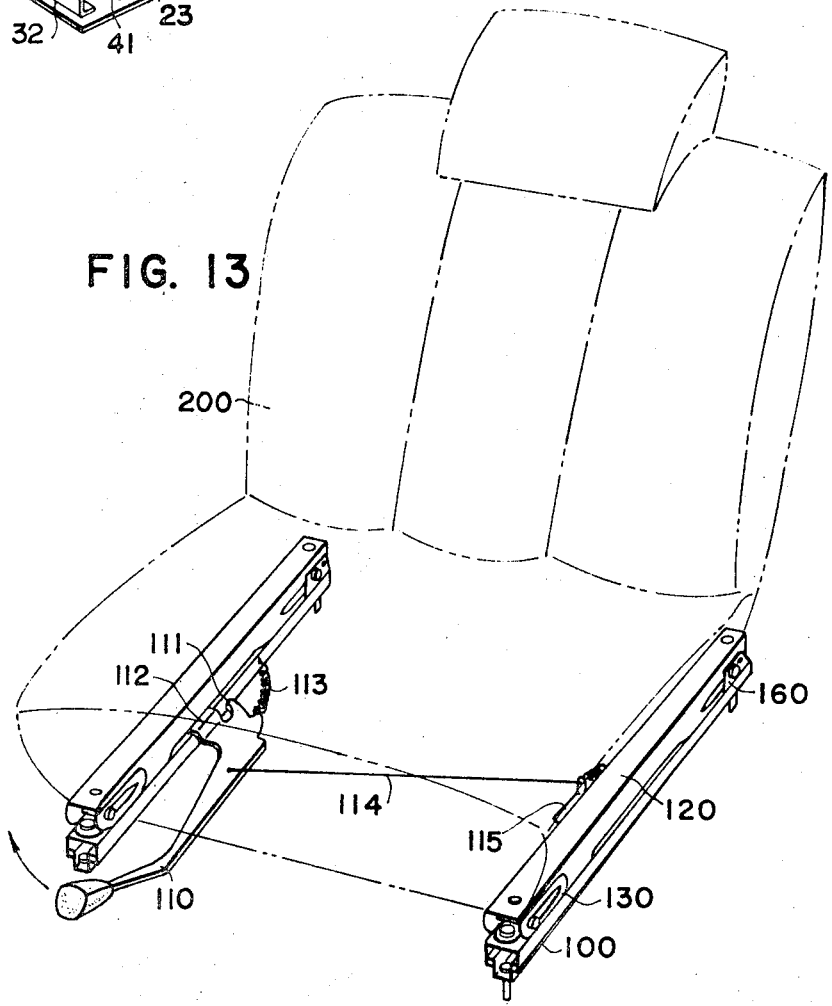
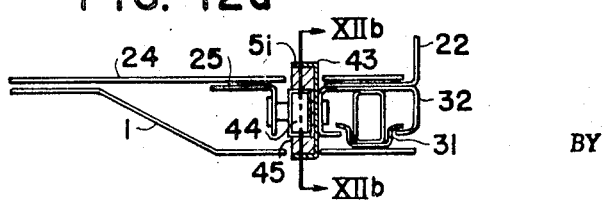

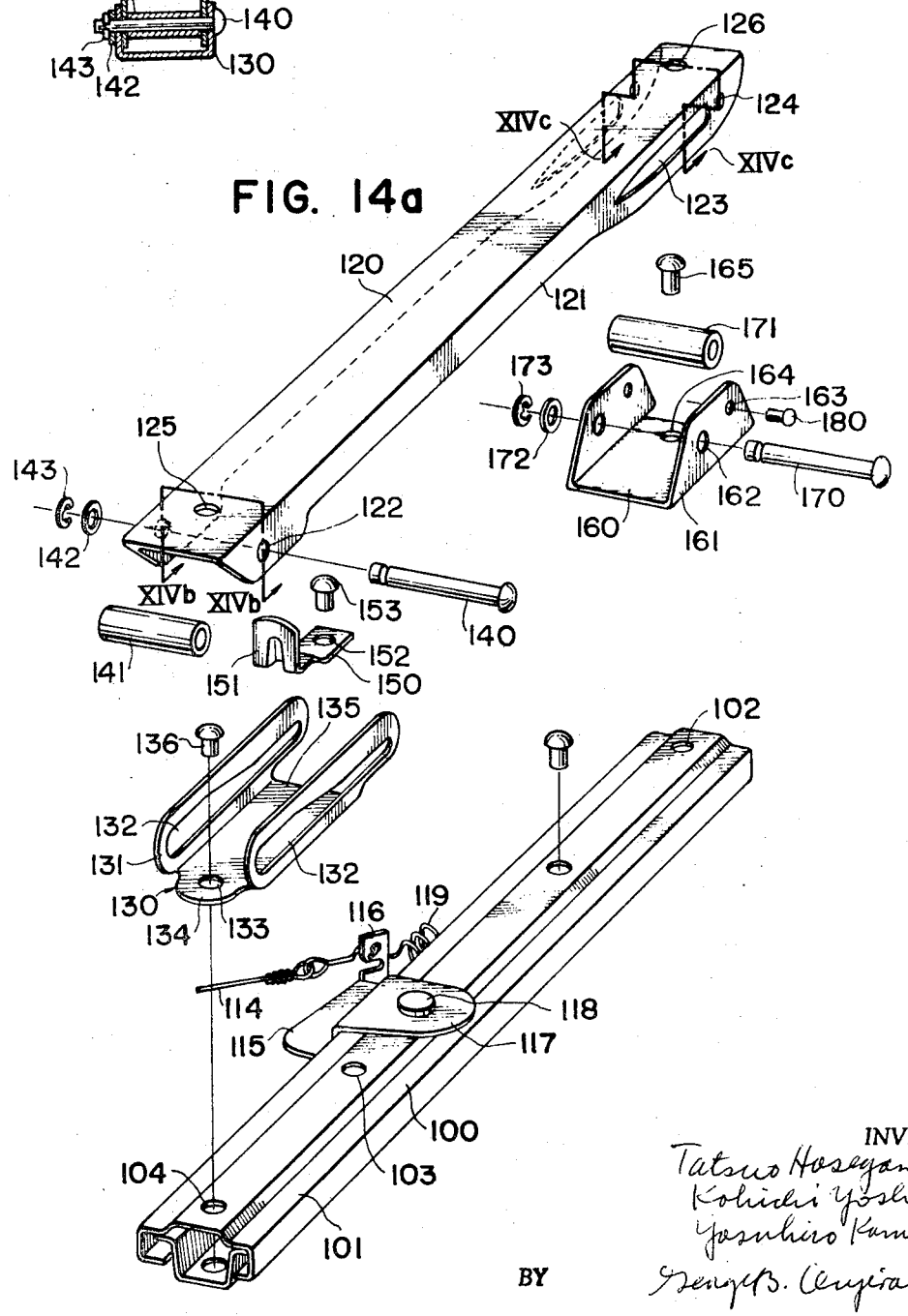

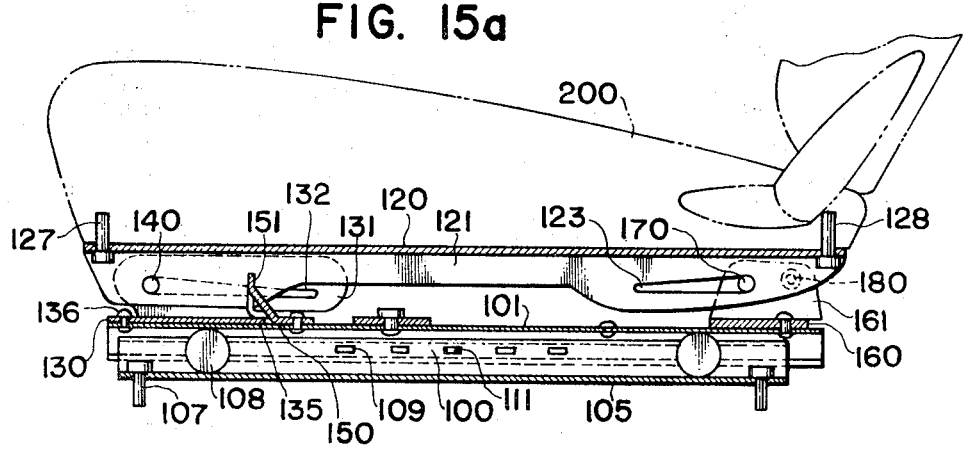

SEAT CONSTRUCTION OF A VEHICLE

BACKGROUND OF THE INVENTION

The present invention relates to a seat construction for protecting passengers from an accident by absorbing the impact energy at the time of a rear-end-collision with a following vehicle.

In general, when a vehicle is moving, the seat of the vehicle is given a large force in the forward or backward directions. For instance, when starting suddenly or when ascending an incline road, a large shearing stress or tensile stress acts on bolts connecting the seat to the mounting floor, due to acceleration and the components of forces on an inclined plane according to weight of seat and passengers and also when applying a sudden brake a reaction due to a large brake-pedal pressure acts on the seat through the passengers.

In order to protect the passengers against injuries due to an accident wherein the seat is cut off from the mounting floor by a force acting on the seat during the moving of the vehicle, it is required for instance, by American Safety Standards, that the seat should not be broken or the attachment to the floor should not get loose even when a force of 20 times as large as the seat weight is applied.

Thus, the seat is so firmly fixed to the floor with an extremely large safety factor in strength and rigidity, that at the time of a rear-end collision accident with a following car, although the impact energy may be partly absorbed by a slight plastic deformation of the seat back, almost the entire impact acts directly on the passengers causing them injuries.

Thus, an object of the present invention is to provide a seat construction which will prevent injuries to the passengers reducing such injuries by an arrangement whereby a force exceeding a predetermined value may not be applied to the passengers, by disconnecting the interconnection between the seat and floor to permit the seat to move rearwards and to pivot and at the same time by absorbing impact energy by the deformation of an energy absorbing member which is disposed between the seat and floor when a force exceeding the predetermined value is applied to the seat.

SUMMARY OF THE INVENTION

According to the present invention, the seat assembly is composed of a floor, a seat, a movable support member for supporting the seat so as to permit the seat to move a relative to the floor, a fixing member e.g., a pin for fixing the seat on the floor so as to prevent the seat from moving relative to the floor, the fixing member including a release section, or weak link and an energy absorbing member disposed between the floor and the seat. When an impact exceeding a predetermined value acts on the seat in the forward direction through the fixing member, this fixing member is released to permit the seat to move relative to the floor in the backward direction by the inertia of the seat and passengers and at the same time the energy absorbing member is deformed, thus reducing the impact applied to the passengers. The movable support member may be composed of either a guide member for supporting the seat so that the seat may move in a linear motion in the backward direction or a pivotal member for supporting the seat so that the seat may pivot on an axis at the rear end of the seat lower portion.

According to another aspect of the present invention, the movable support member will allow the seat to pivot and also permit rearward rectilinear movement by the combination of the guide member and pivoting member when an impact is applied.

Consequently, the amount of deformation of the energy absorbing member can be increased within a narrow space, so that injuries caused to passengers riding in the back seat is avoided and it is possible to absorb a stronger impact and also act for a sufficient time until a maximum impact is completely suppressed.

Furthermore, according to the present invention, during the initial movement of the seat, the seat is permitted to carry out only a rearward rectilinear movement and after completing a predetermined stroke of the linear movement, the seat then pivots by means of a limit member.

By the seat construction according to the present invention an impact having a force stronger than a predetermined value does not act on the passengers at the time of a rear-end collision with a following vehicle thus preventing or reducing the injuries to the passengers.

Furthermore, the energy absorbing member can be combined in common use with a guide member, so that the seat assembly may be made of a small number of the component parts.

BRIEF DESCRIPTION OF THE DRAWINGS

The drawings show two examples of the seat constructions embodying the present invention.

FIGS. 5a and 5b are views showing a third type of an energy absorbing member and its plastic deformation which is useful in the seat assembly of FIG. 1;

FIGS. 6a and 6b are views showing a fourth type of an energy absorbing member and its plastic deformation which is useful in the seat assembly of FIG. 1;

FIGS. 7a and 7b are views showing a fifth type of an energy absorbing member and its plastic deformation which is useful in the seat assembly of FIG. 1;

FIGS. 8a and 8b are views showing a sixth type of an energy absorbing member and its plastic deformation which is useful in the seat assembly of FIG. 1;

FIGS. 9a, 9b and 9c are views showing a seventh type of an energy absorbing member and its plastic deformation which is useful in the seat assembly of FIG. 1;

FIGS. 10a and 10b are views showing an eighth type of an energy absorbing member and its plastic deformation which is useful in the seat assembly of FIG. 1;

FIG. 11 is a perspective view of still another type showing details of energy absorbing members useful in the seat assembly in FIG. 1;

FIG. 12a is a side view of a portion of the type shown in FIG. 11;

FIG. 12b is a sectional view of one of the components shown in FIG. 12a, along lines 12a—12b thereof;

FIG. 13 is a perspective view of a second embodiment of the seat assembly according to the present invention;

FIG. 14a is an exploded view showing the disassembled component members of part of the second seat assembly in FIG. 13;

FIGS. 14b and 14c are cross-sectional end views of the seat assembly part which is shown in FIG. 14a; and, FIGS. 15a, 15b and 15c are detailed side views showing the operating mechanism of the seat assembly of FIG. 13 at various seat positions relative to the floor.

DETAILED DESCRIPTION OF THE INVENTION

Figure 1:
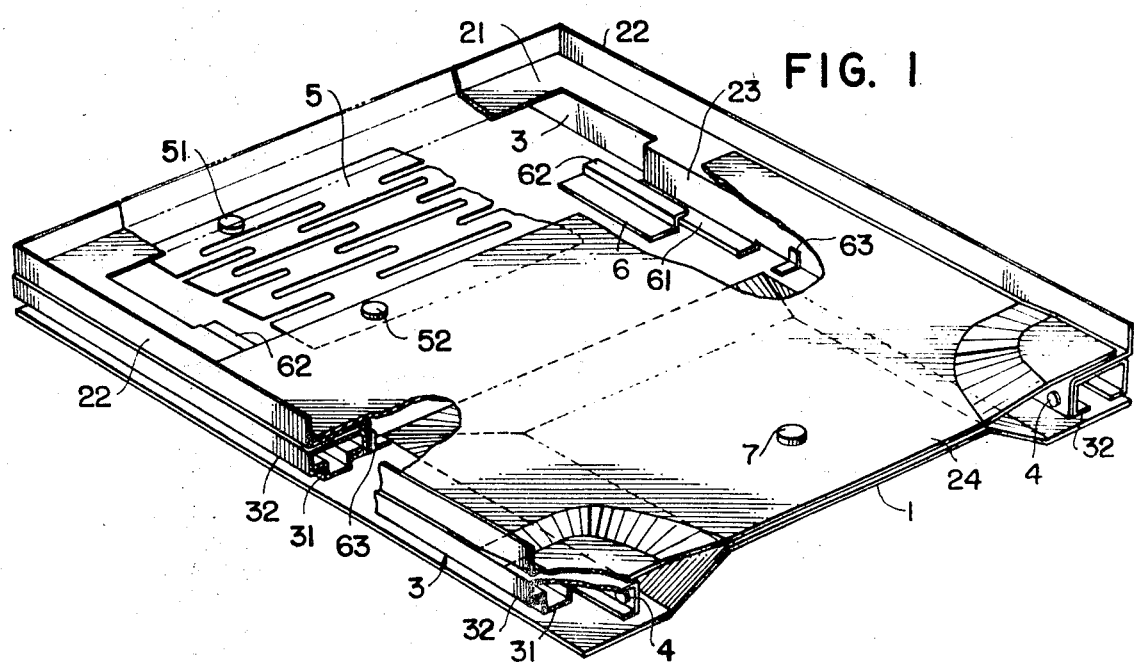
FIG. 1 is a perspective view showing an essential part of the one embodiment of the seat assembly of the present invention.

FIG. 1 shows an essential part of a seat assembly of one embodiment of the present invention. There is a seat floor or body floor 1 fixed to the vehicle floor surface (of a vehicle not shown), a seat bottom frame 21 on which a seat is mounted and around the outer periphery of which a sideplate 22 is provided. Two inside plates 23 are bent down in the opposite direction to sideplate 22 and are provided on both sides of frame 21 in the lengthwise direction. On the upper surface of the seat bottom frame 21, a bottom plate 24 is mounted by a suitable means such as welding. Each of two guide members 3 is arranged on both sides of the floor 1 in the lengthwise direction. Each of the guide members 3 is composed of a guide frame 31 fixed on floor 1 and a slide frame 32 sliding along the guide frame 31 in pinching engagement.

These slide frames 32 are pivotally connected with the inside plates 23 of the seat bottom frame 21 by pivotal members, that is two pivots 4 in the neighborhood of the rear end, so that the seat bottom frame 21 is capable of linear, i.e., rectilinear movement in the lengthwise direction by means of the guide members 3 and at the same time is pivotally supported on the guide members 3.

As energy absorbing member 5 arranged between the floor 1 and bottom plate 24 is fixed on the floor 1 with two pins 51 at one end and fixed on the bottom plate 24 with two pins 52 at the other end. Further, the floor 1 is press-formed so as to make contact with the bottom plate 24 at the rear portion, where the floor 1 and bottom plate 24 are connected to each other by a stationary member 7. The stationary member 7 serves to act as a shear pin the strength of which is selected so as to cut when a shearing stress stronger than a predetermined value is applied. Sliding pieces 61 are provided on a part of each of inside plates 23 of the bottom frame 21 as one body and held under each of the guide plates 62 fixed on the floor 1. Stopping pieces 63 are fixed on opposite sides of floor 1 at positions behind the rear end of guide plate 21 at a slightly longer distance than the length of the sliding piece 61 in the lengthwise direction.

Figure 2A:
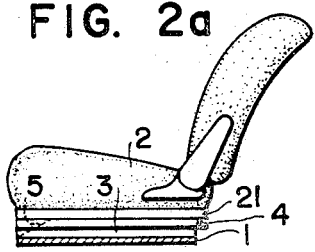
FIGS. 2a, 2b and 2c are side views of the seat assembly in FIG. 1.

These pieces 61 and 63 make up pivot limit members 6 which prevents rotation of the seat bottom frame 21, that is to say the seat is held by the guide plates which only permit the rearward rectilinear movement of the seat until the sliding pieces 61 come out of the guide plates 62. Explaining the operation of the seat construction in FIG. 1, together with the impact absorbing members in FIGS. 2a to 2c, a seat 2 is mounted upon the seat bottom frame 21 and connected with bolts. FIG. 2a shows the normal position of the seat 2, in which the stationary member, that is the shear pin 7, is not yet cut and maintains the connection between the bottom plate 24 and floor 1. The shearing strength of the shear pin is so determined that the shear pin may cut at an applied force of 300 kgs. assuming the seat weight 15 kgs. in conformity to, for instance, the American Safety Standards.

Figure 2B:
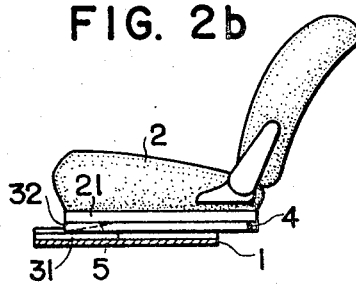
Figure 2C:
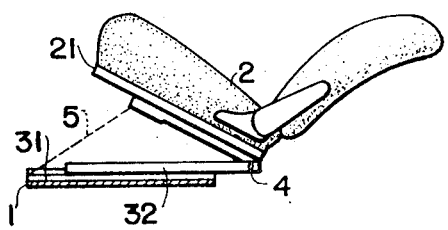

When a rear-end collision by the following vehicle happens, a forward acceleration force acts on the seat and passengers (not shown) through the above shear pin 7. In other words, the collision force is such that the seat and passengers possess a rearward inertia force equal to the acceleration force. If this acceleration force exceeds the shearing strength of the shear pin, the shear pin cuts to disconnect the connection between the floor 1 and the bottom plate 24. Thus, the seat 2 moves backwards along the floor 1 by the inertia force of the seat 2 and passengers. As the gravity center of the seat 2 and passengers of course lies in a higher position than the floor 1, there takes place a pivotal moment having its center at the pivot 4 on the seat, however the pivotal motion of the seat 2 is prevented by the engagement between the sliding pieces 61 provided on the seat side and stationary guide plates 62 located on the floor side. Thus, in the beginning, as shown in FIG. 2b, only a horizontal movement in the backward direction is carried out. When the front ends of the sliding pieces 61 make a dashing contact with the stoppers 63, additional horizontal movement is prevented so as to release the engagement between the sliding pieces 61 and stationary guide plates 62 and simultaneously the inertia force of the seat 2 and passengers acts as shown in FIG. 2c on the seat and passengers. In other words, a pivotal movement takes place to pivot the seat and passengers and this pivotal movement centers at pivot 4.

The energy absorbing member 5 provided between the floor 1 and seat bottom plate 24 absorbs the impact energy of the linear motion and pivotal motion, of the seat, and only an almost constant force which is safely permissible for the passengers and seat is allowed to act during movement of the seat. In the maximum pivotal position of the seat as shown in FIG. 2c, the energy absorbing member 5 acts to restrict the pivotal motion or movement so as not to exceed this maximum limit and thus presents a sort of semirigid coupled condition.

During movement of the seat, the inertia force of the seat and passengers as hereinbefore explained is a force provided by the vehicle or the floor, so that it can not be stronger than the force required to deform the energy absorbing member. Accordingly, if the deformation characteristic of the energy absorbing member is selected so that a deformation amount for unit length may necessitate only a constant energy independently of the relative distance between the seat and floor, in other words, if the energy absorbing member is so selected as to continue to deform according to a preset pattern with a constant force applied, the seat and passengers are only subjected to receiving a constant inertia force. If this inertia force is restricted below a permissible value for a person and moreover if it is possible to cause the velocity of the passengers and seat with respect to the car body to substantially an equal zero until the seat reaches the final movement position, the passengers will never be subjected to a stronger force than a constant force for deforming the energy absorbing member and the velocity of the passengers is made to follow the car velocity with safety, thereby preventing the passengers from injuries.

Figure 3A:
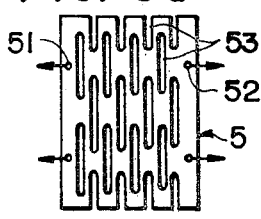
FIGS. 3a and 3b are views showing one type of an energy absorbing member and its plastic deformation which is useful in the seat assembly of FIG. 1.
Figure 3B:
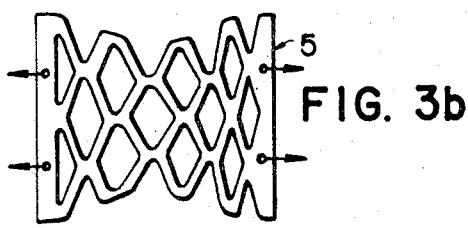

According to the present invention, plastic deformations for the material are employed in order to obtain energy absorbing members having deformation characteristics as hereinbefore explained. The energy absorbing member 5 in FIG. 1 is shown in detail in FIG. 3a. In this construction, a number of slits 53 are made alternately on a suitable plate such as a steel sheet and so on and it has the shape of a kind of wire-nettings. Each end is fixed on the floor and bottom plate with fixing pins 51, 52. When forced to expand in accordion fashion in the directions of the arrows by movement of the seat it deforms as shown in FIG. 3b. Upon reaching a certain amount of deformation the movement is prevented.

Figure 4A:
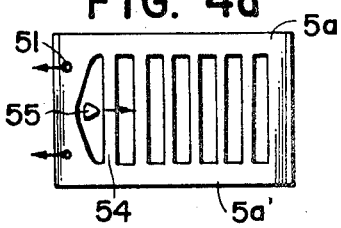
FIGS. 4a and 4b show views of a second type of an energy absorbing member and its plastic deformation, which is useful in the seat assembly of FIG. 1.
Figure 4B:
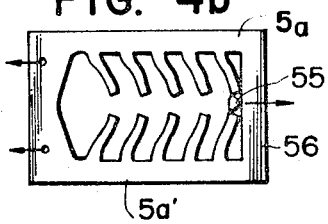

Other embodiments of energy absorbing members are shown in FIG. 4a to FIG. 12b. An energy absorbing member 5a shown in FIG. 4a is composed of a plate 5a' with a plurality of beams 54 formed in a ladder, and a hook 55 fixed on the seat. If a force in the direction of the arrow is applied by movement of the seat, the hook 55 moves sequentially on as cutting the beam 54 and it is stopped when it reaches frame member 56 as shown in FIG. 4b. An energy absorbing member 5b shown in FIG. 5a is composed of a plate 5b' having comb-shaped lugs arranged face to face to each other, and a hook 55'. As shown in FIG. 5b, by deformation of these face to face lugs the impact energy is absorbed and further movement of hook 55' is also prevented at the frame member 56'.

An energy absorbing member 5c shown in FIG. 6a is composed of a plate or pipe 5c' providing a lengthwise directional slit 58, and a hook 55''. As shown in FIG. 6b, the impact energy is absorbed by extension and deformation, of the slit 58 worked by the hook 55''. An energy absorbing member 5d shown in FIG. 7a is composed of a plate or rod bent to a bellows shape and the impact energy is absorbed by plastic deformation due to tension as shown in FIG. 7b. An energy absorbing member 5e shown in FIG. 8a is composed of a pipe 81, a rod 82 inserted thereinto; and plastic substances 83 filled between said pipe 81 and rod 82. The internal surface of the pipe 81 and the external surface of the rod 82 are each made of an uneven face 84, whereby adhesion of both surfaces to the plastic substances 83 is sufficiently secured.

The plastic substances 83 are broken by a tensile force in the direction of the arrow and the rod 82 is forcedly drawn out as shown in FIG. 8b. In this case, while being drawn out, friction is caused between the plastic substances so that the energy absorption is carried out by breakage and friction, of the plastic substances. An energy absorbing member 5f shown in FIG. 9a is composed of a cylinder 91, a piston 92, and a suitable liquid as oil and so on sealed in the cylinder 91.

As shown by a cross-sectional view in FIG. 9c, the piston 92 has a great number of slender holes. As shown in FIG. 9b, when the piston 92 is forced to move, the energy absorption is performed by viscous friction of liquid 93 passing through the holes 94.

An energy absorbing member 5g in FIG. 10a is composed of a pipe 91' and a piston 92' having a larger diameter than the pipe 91' and the energy absorption is accomplished by deformation and extension, of the pipe 91' by movement of the piston 92' as shown in FIG. 10b.

In FIG. 11, the energy absorbing member 5h includes a shaft 4', fixed on both ends 41 and not rotatable with respect to sliding frames 32, and also fixed to the floor 24 by a connecting pin 42 in the center. This energy absorbing member 5h is to absorb an impact energy at the time of the pivotal motion which when performed will cause deformation by twisting of the shaft 4'. Moreover, another energy absorbing member 5i shown in FIG. 12a and FIG. 12b is also designed to act as an object for energy absorption due to pivotal movement. This member 5i is composed of a polygonal, for instance, a hexagonal external frame 43 and internal frame 44, and plastic filling the space between both frames. The external frame 43 is fixed to sliding frame 32 and the internal frame 44 is fixed to supporting piece 25 fastened to the floor 24. A torque applied to the seat by pivoting is absorbed by action of breakage of the plastic 45.

FIG. 13 shows a seat assembly of a second embodiment having a different mechanism from the seat assembly shown in FIG. 1. A seat 200 is mounted upon a seat position adjuster through an energy absorbing mechanism according to the present invention. The seat position adjuster is composed of two guide mechanisms 100 arranged on both sides under the seat 200, and an adjusting lever 110. There are also a hook 115 and an interconnecting rope 114. By movement of the adjusting lever 110 in the direction of the arrow, a hook piece 111 integral with the lever 110 and a hook piece of the hook 115 are disengaged from set holes to permit the seat 200 to move forwards and backwards and by means of the hook piece 111, etc. the seat 200 is again fixed at a predetermined position. There is an arm 112 with a shaft support point and a return spring 113 for the lever 110. The energy absorbing mechanism of the present invention is composed of two bottom seat frames 120, two guides 130, two supports 160, and so forth, each of these metal fittings is shown in detail in FIG. 14a to FIG. 14c.

Each of guide mechanisms 100 of the seat position adjuster in FIG. 14a is composed of a slide frame 101 and a stationary guide frame 105, and is similar to the guide member 3 in FIG. 1 but this is only used to facilitate the forward and backward movement at the time of adjustment of the seat and not used as a means of guiding the energy absorbing mechanism. Each slide frame 101 has a plurality of fixing holes 102 to 104, which are used for fixing the support 160, stopper 150 and guide 130. Further, on each slide frame 101, the hook 115 cooperating with the adjusting lever 110 is fixed to an arm 117 with a shaft pin 118.

Each end of the interconnecting rope 114 and return spring 113 is engaged with the interconnecting piece 116. The hook 115 can be inserted into any one of a plurality of set holes 109 (in FIG. 15a) in the stationary guide frame 105 through an opening perforated in the lateral surface of the slide frame 101.

The energy absorbing mechanism of this invention is composed of two bottom frames 120 attached to the bottom of the seat 200, two guides 130, two stoppers 150, supports 160, fixed on the slide frames 101 respectively, and two axial pins 140 and 170 for connecting these metal fittings. Each seat frame 120 has a sideplate 121. This sideplate 121 has two axis holes 122 at one end and two wedge-shaped slits 123 and a pinhole 124 at the other end, and also has fixing holes 125 and 126 at both ends on the upper surface. Each guide 130 has a wedge-shaped slit 132 on both sideplates and a fixing hole 133 on the bottom plate tongue 134. The bottom rear portion 135 of the guide 130 is pressed upon the slide frame 101 by a part of the stopper 150. Each stopper 150 is made in a nearly L-shape form having a stop piece 151 and a fixing hole 152, and is fixed to the fixing hole 103 of the slide frame 101 with a pin 153. Each support 160 has two axial holes 162 and a pinhole 163 on the sideplate 161, and is fixed to the hole 102 of the slide frame 101 with a pin 165.

The guide 130 and support 160 are connected to the bottom seat frame 120, as shown in FIG. 14b and FIG. 14c, by means of axial pins 140, 170, spacers 141, 171, washers 142, 172, and E-rings 143, 173. Further, when the rearward inertia force applied to seat 200 is less than a predetermined value, there is no breaking of a shear pin 180 in pinhole 163, of the support 160 so that pinhole 124 of the bottom seat 120 is secured tightly next to hole 163. This will maintain the position of the seat 200 as it is.

FIG. 15a shows the energy absorbing mechanism of FIG. 14a under the steady state, in which the bottom seat frame 120 and seat 200 are connected with fixing bolts 127, 128 and the guide frame 105 of the seat position adjuster is fixed to the floor surface (not shown) with bolts 107. Each of two rollers 108 are arranged on both sides of seat 200 between the slide frame 101 and guide frame 105 of the seat position adjuster in order to support the weight of the seat 200 and passengers. A plurality of set holes 109 are perforated on the sidewall of the guide frame 105 and the hook piece 111 of the hook 115 is inserted in a set hole 109 in the center.

As apparent from FIG. 15a, the wedge-shaped slits 132, 123 perforated on the sideplate 131 of the guide 130 and the sideplate of the bottom seat frame 120 provides a suitable size of opening at one end so that the axial pins 140, 170 may be inserted thereinto respectively, and are so constructed that the size of the openings gradually becomes narrower toward one end and eventually smaller than the size of axial pins 140, 170 at that end. Particularly, the length of the wedge-shaped slit 132 is formed a little longer than that of the slit 123, which will contribute to energy absorption during pivotal movement.

The rectilinear movement of seat 200 in the rearward direction is prevented by the shear pin 180 and the pivotal motion of the seat 200 about axial pin 170 is also prevented by pressing of the bottom plate rear portion 135 of the guide 130 by part of the stopper 150.

When the inertia force applied to seat 200 is stronger than the shearing strength of the shear pin 180, the shear pin 180 breaks down thus releasing the seat frame 120 from being fixed to the support 160.

Accordingly, the seat 200 can make a linear movement in the rearward direction and the axial pins 140 fixed to the bottom seat frame 120 moves progressively in a manner tending to deform the wedge-shaped slits 132 of the guides 130. On the other hand, the axial pins 170 on supports 160 act to permit the bottom frame 200 to make a linear movement and axial pins 170 tend to deform the wedge-shaped slits 123 perforated in the sideplates 121 of the bottom seat frames 120. FIG. 15b shows the final position of the rectilinear motion of the bottom frames 120. In this condition, the axial pins 140 fixed to the bottom seat frames 120 come into contact with stop pieces 151 of stoppers 150 and bend these stop pieces. In this stage, there remain the slits 132 not yet deformed on the sideplates 131 of guides 130. However, the slits 123' on the sideplates 121 of bottom frames 120 are fully deformed along the entire length thus preventing the seat 200 from further rectilinear movement. The bottom plate rear positions 135 of the guides 130 are free to move due to bending of the stop pieces 151 by the action the axial pins 140 and simultaneously the inertia force of the seat 200 and passengers acts on the guides 130 through the axial pins 140 as a torque to cause a pivotal moment centered at the axial pin 170, so that the guides 130 are forced to guide the axial pins 140 in the wedge-shaped slits 132 while being bent at the bottom plate tongues 134 with center at the fixing pin 136.

FIG. 15c shows the final position of the pivotal motion of the seat 200, wherein the wedge-shaped slits 132 of the guides 130 are fully extended and deformed to change into the shape of parallel slit 123' thus preventing the seat 200 from further carrying on the turning motion.

In the second example of the present invention shown in FIG. 13 to FIG. 15, the energy absorbing member and the guide member are combined. Namely, the guides 130, supports 160, bottom seat frames 120, and axial pins 140, 170 compose the mechanism for the rectilinear movement and pivotal movement and at the same time the slits necessary for movements of these members are made in a wedge shape, so that an energy absorbing member is also provided.

In the second embodiment, the energy absorbing mechanism is mounted upon the seat position adjuster. This arrangement simplifies the mounting of the seat upon the car body. Consequently, although the energy absorbing member is directly mounted upon the car body, it is apparent that it will never fail to fulfill its function.

In the above embodiment, the mechanism is so constructed that the movement of the seat is carried out only by the rectilinear movement in the initial stage and changed into the pivotal movement in the next stage, however, it is also possible that, if the pivot limit member is omitted, the rectilinear motion and pivotal movement are simultaneously carried out by the seat. Moreover, the energy absorbing mechanism can comprise the movable support members of either the rectilinear movement or pivotal movement.

We claim:

1. In a seat assembly for a vehicle having a floor (1), a seat (2 or 200), movable support means supporting the seat (2 or 200) so that the seat is capable of making a linear movement relative to the floor, and a stationary member (7 or 180) fixing the seat with respect to the floor so as to prevent the seat from moving relative to the floor, the improvement therein comprising, a releasable section included in said stationary member (7 or 180) and, an energy absorbing member (5 or 123 and 132) provided between the floor and seat so that when an impact having a force greater than a predetermined value in the forward direction is applied to the seat through said stationary member, the releasable section thereof releases the seat to permit the seat to make a rearward movement relative to the floor by the inertia of the seat and passengers and at the same time, the energy absorbing member is plastically deformed to reduce the impact applied to the passengers riding in the seat.

2. A seat assembly as claimed in claim 1, including bottom seat frame arrangement (120) fixed to the bottom of said seat (200), an elongated guide frame arrangement (100) defining a travel path for said seat frame arrangement (120), said stationary member (180, 161) pivotally joining said bottom seat frame arrangement (120) to said guide frame arrangement (100) towards the rear of said arrangements, sideplates (121) including sideplate deforming means (140, 170) operably connected between said guide frame arrangement (100) and said seat frame arrangement (120), said deforming means (140, 170) defining a path of travel first in the linear direction and afterwards in a pivotal movement, and stop means (150) limiting the linear movement and causing the pivotal movement to start.

3. A seat assembly as claimed in claim 1, including a seat bottom frame (21) with a rear end, disposed for linear movement, guide members (3) including a guide frame (31) and a slide frame (32) for sliding along said guide frame, a pivotal member (4) pivotally connecting said slide frame (32) and said seat bottom frame (21), and, stopping pieces (63) at a predetermined location along said guide frame (31) whereby when said impact is received and said releasable section releases the seat, said slide frame (32) will slide along said guide frame (31) until it hits the stopping pieces (63) before starting a pivotal movement.

4. A seat assembly as claimed in claim 3, wherein said energy absorbing member comprises a component capable of expansible and compressible deformation, wherein said expansion or compression plastically deforms said component against the internal resistance of said component.

5. A seat assembly for a vehicle, comprising in combination, a floor (1), guide means (3) supporting the seat so that the seat is capable of making a linear movement in the rearward direction with regard to the floor, a pivotal member (4) supporting the seat at the rear thereof so that the seat is capable of making a pivotal movement about an axis at the rear end of the seat lower portion, pivot limiting means permitting the seat to make a rearward linear motion in the initial movement of the seat and permitting the seat to make a pivotal movement after completing a predetermined stroke of the rearward linear movement, a stationary member (7) fixing the seat to the floor so as to prevent the seat from movement relative to the floor including a releasable section therein, and, an energy absorbing member (5) provided between the floor and seat, whereby, when an impact having a force stronger than a predetermined value in the forward direction is applied to the seat through the stationary member, said releasable section will release the seat and the seat makes a rearward linear movement and then makes a pivotal movement with regard to the floor by inertia of the seat and passengers, while at the same time, the absorbing member is plastically deformed to reduce the impact imposed on the passengers riding in the seat.

6. A seat assembly for a vehicle, comprising in combination, a floor, a seat (200), guide means (100) supporting this seat so that the seat is capable of making a linear movement in the rearward and forward direction with regard to the floor, a pivotal member (170) supporting the seat at the rear thereof so that the seat is capable of pivoting about an axis at the rear end of the seat lower portion, a stationary member (180) fixing the seat with respect to the floor so as to prevent the seat from making a movement relative to the floor including a releasable section therein, and energy absorbing means (123, 132) provided between the floor and the seat, whereby, when an impact having a force greater than a predetermined value in the forward direction is applied to the seat through the stationary member, the releasable section of the stationary will release to permit the seat to make a rearward linear movement and a pivotal movement by the inertia of the seat and passengers and at the same time, the absorbing member is plastically deformed to reduce the impact applied to the passengers riding in the seat.